United States Patent
Kogure

(10) Patent No.: US 10,291,361 B2
(45) Date of Patent: May 14, 2019

(54) BASE STATION, RECEPTION CONFIRMATION METHOD, AND STORAGE MEDIUM WHEREIN PROGRAM IS STORED

(71) Applicant: NEC Corporation, Tokyo (JP)

(72) Inventor: Yuki Kogure, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 159 days.

(21) Appl. No.: 15/315,807

(22) PCT Filed: Jun. 1, 2015

(86) PCT No.: PCT/JP2015/002747
§ 371 (c)(1),
(2) Date: Dec. 2, 2016

(87) PCT Pub. No.: WO2015/186334
PCT Pub. Date: Dec. 10, 2015

(65) Prior Publication Data
US 2017/0104557 A1 Apr. 13, 2017

(30) Foreign Application Priority Data
Jun. 4, 2014 (JP) .................................. 2014-115581

(51) Int. Cl.
*H04L 1/18* (2006.01)
*H04L 1/16* (2006.01)
(Continued)

(52) U.S. Cl.
CPC ............ *H04L 1/1812* (2013.01); *H04L 1/004* (2013.01); *H04L 1/16* (2013.01); *H04L 1/1664* (2013.01);
(Continued)

(58) Field of Classification Search
CPC .................................................. H04W 72/042
See application file for complete search history.

(56) References Cited

U.S. PATENT DOCUMENTS

| 2011/0013615 | A1* | 1/2011 | Lee ........................ H04L 5/0023 370/344 |
| 2012/0106569 | A1 | 5/2012 | Che et al. |
| 2014/0003276 | A1* | 1/2014 | Zhou ...................... H04W 24/08 370/252 |

FOREIGN PATENT DOCUMENTS

| JP | 2008-289114 A | 11/2008 |
| JP | 2011-061667 A | 3/2011 |

(Continued)

OTHER PUBLICATIONS

"ACK/NAK DTX Detection in the PUSCH" Samsung, May 5-9, 2008, [online], 3GPP TSG-RAN WG1#53 R1-081728, Internet <URL:http://www.3gpp.org/ftp/tsg_ran/WG1_RL1/TSGR1_53/Docs/R1-081728.zip>, 208.05.

(Continued)

*Primary Examiner* — Zhiren Qin
(74) *Attorney, Agent, or Firm* — Sughrue Mion, PLLC

(57) ABSTRACT

[Problem] To avoid the occurrence of a "DTX-ACK" error or "DTX-NACK" error when a terminal has failed to receive uplink control information. [Solution] A base station (20) of a wireless communication system wherein packet retransmission control is performed by means of a hybrid automatic repeat request (HARQ) is equipped with: a physical uplink shared channel (PUSCH) reception processing unit (104) that, when the transmission timing of HARQ information from a terminal (10) coincides with the transmission timing of a PUSCH transmitted from the terminal (10), receives the HARQ information from the PUSCH and performs a cyclic redundancy check (CRC) on a packet included in the PUSCH; and an HARQ information check unit (105) that (Continued)

performs HARQ-based confirmation of reception at the terminal (10) by receiving the HARQ information checked by the PUSCH reception processing unit (104) and the CRC result.

10 Claims, 9 Drawing Sheets

(51) Int. Cl.
    *H04W 76/28*      (2018.01)
    *H04L 1/00*      (2006.01)
    *H04L 5/00*      (2006.01)
    *H04W 72/04*      (2009.01)
    *H04W 52/02*      (2009.01)
    *H04L 1/12*      (2006.01)

(52) U.S. Cl.
CPC ............ *H04L 1/1671* (2013.01); *H04L 1/188* (2013.01); *H04L 1/1848* (2013.01); *H04L 5/0057* (2013.01); *H04W 52/0216* (2013.01); *H04W 72/042* (2013.01); *H04W 72/0413* (2013.01); *H04W 76/28* (2018.02); *H04L 2001/125* (2013.01); *Y02D 70/00* (2018.01); *Y02D 70/1262* (2018.01); *Y02D 70/24* (2018.01); *Y02D 70/25* (2018.01)

(56) References Cited

FOREIGN PATENT DOCUMENTS

| | | |
|---|---|---|
| JP | 2012-517164 A | 7/2012 |
| JP | 2014-511622 A | 5/2014 |
| JP | 2014-183357 A | 9/2014 |
| WO | 2008/096877 A1 | 8/2008 |
| WO | 2008/105421 A1 | 9/2008 |
| WO | 2012/035712 A1 | 3/2012 |
| WO | 2013/027721 A1 | 2/2013 |

OTHER PUBLICATIONS

Written Opinion of the International Searching Authority of PCT/JP2015/002747 dated Aug. 11, 2015.
International Search Report of PCT/JP2015/002747 dated Aug. 11, 2015.

\* cited by examiner

BASE STATION, RECEPTION CONFIRMATION METHOD, AND STORAGE MEDIUM WHEREIN PROGRAM IS STORED

This application is a National Stage of International Application No. PCT/JP2015/002747 filed Jun. 1, 2015, claiming priority based on Japanese Patent Application No. 2014-115581 filed Jun. 4, 2014, the contents of all of which are incorporated herein by reference in their entirety.

TECHNICAL FIELD

The present invention relates to a base station, a reception confirmation method, and a storage medium storing a program in a mobile communication system, and relates to a mobile communication technique, in which delivery acknowledgement is performed by an HARQ (Hybrid Automatic Repeat reQuest). In particular, the present invention relates to a mobile communication technique corresponding to a DRX (Discontinuous Reception) function for the purpose of suppressing electric power consumption of a terminal in an LTE (Long Term Evolution) method, providing a chance that a useless transmitting and receiving process is omitted by matching a DRX state between a base station and a terminal from a delivery status of an HARQ.

BACKGROUND ART

Regarding physical channels for use in an LTE (Long Term Evolution) method, as one of methods for a mobile communication system, the following five physical channels are defined as physical downlink channels for transmission from a base station to a terminal. Specifically, the five physical downlink channels are constituted by a PBCH (Physical Broadcast CHannel), a PDCCH (Physical Downlink Control CHannel), a PCFICH (Physical Control Format Indicator CHannel), a PDSCH (Physical Downlink Shared CHannel), and a PHICH (Physical Hybrid-arq (automatic repeat request) Indicator CHannel).

A PBCH is a channel for transmitting broadcast information. A PDCCH is a channel for transmitting information for decoding downlink packet data. A PCFICH is a channel for transmitting information for decoding a PDCCH. A PDSCH is a channel for transmitting downlink packet data. A PHICH is a channel for transmitting a CRC (Cyclic Redundancy Check) check result with respect to a PUSCH (Physical Uplink Shared CHannel) to be described later.

Further, in the LTE method, the following three physical channels are defined as physical uplink channels for transmission from a terminal to a base station. Specifically, the three physical uplink channels are constituted by a PRACH (Physical Random Access CHannel), a PUCCH (Physical Uplink Control CHannel), and a PUSCH.

A PRACH is a channel for transmission in order to perform electric power control while synchronizing with an uplink. A PUCCH is a channel for transmitting HARQ information to be described later, or a CQI (Channel Quality Indicator), a PMI (Precoding Matrix Indicator), or an RI (Rank Indicator) indicating a receiving quality. HARQ information is information for notifying a decoding status of a PDSCH as ACK (ACKnowledgment)/NACK (Negative ACKnowledgment)/DTX (Discontinuous Transmission). A PUSCH is a channel for transmitting uplink packet data, in addition to information included in a PUCCH. Note that one of a PUCCH and a PUSCH is transmitted depending on presence or absence of uplink packet data.

In the LTE method, an operation performed when a terminal receives a signal from a base station is as follows. First of all, a terminal receives a PBCH transmitted from a base station, and then receives a PCFICH. Subsequently, the terminal confirms the number of OFDM (Orthogonal Frequency Division Multiplex) symbols in which a PDCCH is mapped on the basis of a CFI (Control Format Indicator) value detected from a PCFICH, and detects whether or not a PDCCH for the own device is present. Then, when the terminal detects presence of a PDCCH for the own device, the terminal starts receiving a PDSCH by detected downlink control information.

Further, in the LTE method, an operation performed when a terminal transmits a signal to a base station is as follows. When a terminal does not detect presence of a PDCCH for the own device, which is transmitted from a base station, the terminal transmits a PUCCH. On the other hand, when the terminal detects presence of a PDCCH for the own device, the terminal starts transmitting a PUSCH by detected uplink control information. Further, in this case, the base station performs a CRC (Cyclic Redundancy Check) check with respect to the received PUSCH, and transmits the check result to the terminal by a PHICH. The terminal performs uplink packet data re-transmission control on the basis of a CRC check result with respect to a PHICH from the base station.

In the LTE method, a DRX function is employed for the purpose of electric power saving of a terminal. The DRX function is a function of causing a terminal to sleep in a specific state and to stop monitoring a PDCCH for reducing electric power consumption of the terminal. Specifically, it is assumed that a terminal does not receive a PDCCH in an OnDuration section when the terminal is Active, because there is no data to be transmitted or received. In this case, a terminal having a DRX function decodes a PDCCH transmitted from a base station for scheduling only in a next OnDuration section. A section in which a terminal does not decode a PDCCH is referred to as a "DRX section." On the other hand, when a terminal receives a PDCCH in an Active section, the terminal is allowed to activate a DRX Inactivity Timer (extend an Active section), and to continue data communication.

It is assumed that a terminal fails to receive a PDCCH due to a wireless error or the like, despite that a base station has transmitted the PDCCH to the terminal. In this case, when an Active section is extended only in the base station, wireless resources may be useless even when the base station continues scheduling and transmits a PDCCH, because the terminal is in a DRX section.

Various prior arts are proposed relating to the present invention.

For instance, PTL 1 describes packet re-transmission control by an HARQ. In a communication system disclosed in PTL 1, packet missing accompanied by a DTX to ACK error is detected without affecting an existing communication device. In this example, a DTX to ACK error is that a transmission-side communication device erroneously recognizes a DTX, specifically, absence of a re-transmission request from a receiving-side communication device as an ACK. A DTX to ACK error mainly occurs due to a decoding failure of a control channel in a receiving-side communication device.

The communication system disclosed in PTL 1 is constituted by a transmission-side communication device which transmits packets respectively added with sequence numbers and different from one another, and a receiving-side communication device which receives the packets. The receiving-side communication device includes a receiving unit and a determination unit. The receiving unit receives packets with use of a plurality of processes. The determination unit detects missing of reception of any one of the packets in the receiving unit on the basis of the sequence numbers. In this case, the determination unit determines whether or not the one packet is missing accompanied by a DTX to ACK error in the transmission-side communication device, on the basis of a use status of each process.

Further, PTL 2 discloses a technique capable of limiting a probability of a DTX to ACK error to an allowable level. A base station disclosed in PTL 2 includes an interface and a processor. The interface is configured to receive information included in acknowledgement/negative acknowledgement (ACK/NACK) resources in an uplink control channel, and relating to a generated bundled ACK/NACK value and relating to the number of downlink grants detected in a receiving bandwidth of a user device. The processor is configured to execute ACK/NACK/DTX (discontinuous transmission) detection on the basis of the received information, and to determine whether or not the detected ACK/NACK state reflects a proper ACK/NACK on the basis of the ACK/NACK/DTX detection.

PTL 3 discloses a re-transmission control method and a receiving-side device capable of minimizing packet missing when a transmission-side device erroneously detects delivery acknowledgement information transmitted via an HARQ feedback physical channel. The transmission-side device disclosed in PTL 3 includes an MAC multiplexing unit, an MAC header adding unit, and a shared physical control channel receiving unit. The receiving-side device includes a shared physical control channel transmitting unit.

The MAC header adding unit generates a protocol data unit (packet) to be transmitted on a transport channel, which is multiplexed in a shared physical data channel by adding an MAC header and an error-correcting code (such as a CRC) to user data transmitted from the MAC multiplexing unit. The shared physical control channel receiving unit receives delivery acknowledgement information such as an ACK/NACK via a shared physical control channel (HARQ feedback physical channel), and notifies an associated HARQ process of the information. The shared physical control channel receiving unit judges that the device is in a DTX state when the device does not receive delivery acknowledgement information with respect to each packet within a predetermined period of time. The shared physical control channel transmitting unit transmits delivery acknowledgement information (ACK/NACK) notified from each HARQ process via the shared physical control channel (HARQ feedback physical channel).

PTL 4 discloses a base station device and a communication control method capable of appropriately performing a scheduling process and an HARQ process in an LTE downlink and in an LTE uplink. The base station device disclosed in PTL 4 includes a baseband signal processing unit. The baseband signal processing unit includes a layer 1 processing unit.

The layer 1 processing unit performs demodulation and decoding of a CQI or delivery acknowledgement information to be mapped in an uplink control channel transmitted by an uplink. The layer 1 processing unit performs, in the subframe, a process of receiving delivery acknowledgement information or a CQI mapped in a physical uplink control channel (PUCCH) located on both sides of a system band, when delivery acknowledgement information or a CQI relating to a mobile station which does not receive user data is received in an uplink. Then, the layer 1 processing unit notifies an MAC processing unit of the delivery acknowledgement information or a receiving result of a CQI.

The delivery acknowledgement information described above is one of an ACK, a NACK, and a DTX. The DTX means that "a mobile station actually did not deliver delivery acknowledgement information." When the delivery acknowledgement information is determined to be a 'DTX', the base station device re-transmits a downlink shared channel. Note that the scheduling process designates a process of sorting out mobile stations which receive user data with use of a shared channel in a downlink of the subframe.

PTL 5 discloses a terminal device and a re-transmission control method capable of improving characteristics of a response signal (an ACK/NACK signal, or "A/N") having poor transmission characteristics. A base station disclosed in PTL 5 includes a data transmission control unit, a modulation unit, a PUCCH extraction unit, and a re-transmission control signal generation unit.

When the data transmission control unit receives a NACK or a DTX with respect to downlink data transmitted from the re-transmission control signal generation unit with use of a certain downlink unit band, the data transmission control unit outputs holding data associated with the downlink unit band to the modulation unit. When the data transmission control unit receives an ACK with respect to a downlink transmitted from the re-transmission control signal generation unit with use of a certain downlink unit band, the data transmission control unit deletes holding data associated with the downlink unit band.

The PUCCH extraction unit extracts, from a PUCCH signal included in a receiving signal, a signal in a PUCCH region associated with a bundled ACK/NACK resource, which is notified to a terminal in advance. Further, the PUCCH extraction unit extracts, from a PUCCH signal included in a receiving signal, an A/N resource associated with a CCE (Control Channel Element) occupied by a DPCCH used in transmitting downlink allocation control information (DCI), and a plurality of PUCCH regions associated with a plurality of A/N resources notified to a terminal in advance.

CITATION LIST

Patent Literature

[PTL 1] Japanese Laid-open Patent Publication No. 2011-061667
[PTL 2] Published Japanese Translation of PCT International Publication No. 2012-517164
[PTL 3] International Publication No. WO2008/096877
[PTL 4] International Publication No. WO2008/105421
[PTL 5] International Publication No. WO2012/035712

SUMMARY OF INVENTION

Technical Problem

When a base station transmits a PDSCH, and a PDCCH for uplink control information (Uplink Grant) to a terminal, a "DTX-ACK" error and a "DTX-NACK" error may occur.

In this example, a "DTX-ACK" error and a "DTX-NACK" error mean that a base station erroneously detects a decoding status of a PDSCH as an ACK or a NACK when the decoding status of the PDSCH is judged to be a DTX because a terminal does not detect a PDCCH. Specifically, it is assumed that a terminal judges a decoding status of a PDSCH as a DTX in a downlink, despite that a base station transmits the PDSCH. In this case, the base station decodes HARQ information with respect to a PUSCH. As a result, in the case of a DTX, a base station may decode packet data with respect to a PUSCH as HARQ information, and may erroneously detect the decoding status of a PDSCH as an ACK or a NACK.

Further, generally, when a base station determines a CRC check result with respect to a PUSCH as a NACK in HARQ re-transmission control in an uplink, the base station judges that "a terminal receives a PDCCH". Consequently, this allows a base station to transmit only HARQ information to a terminal by a PHICH without transmitting a PDCCH, which is referred to as Non-adaptive re-transmission, and to schedule re-transmission.

However, in a general configuration as described above, a "DTX-ACK" error and a "DTX-NACK" error may occur.

For instance, it is assumed that, when a base station transmits a PDSCH, and a PDCCH for uplink control information to a terminal, the terminal judges the PDSCH as an ACK, but fails to receive the uplink control information. In this case, the terminal transmits HARQ information by a PUCCH, but the base station tries to judge HARQ information by decoding a PUSCH. As a result, a "DTX-ACK" error or a "DTX-NACK" error may occur.

PTL 1 merely discloses a technical idea that it is determined whether or not a packet is missing accompanied by a DTX to ACK error in a transmission-side communication device, on the basis of a use status of each process.

PTL 2 merely discloses a technical idea of receiving information included in acknowledgement/negative acknowledgement (ACK/NACK) resources in an uplink control channel, and relating to a generated bundled ACK/NACK value and relating to the number of downlink grants detected in a receiving bandwidth of a user device; executing ACK/NACK/DTX (discontinuous transmission) detection on the basis of the received information, and judging whether or not the detected ACK/NACK state reflects a proper ACK/NACK on the basis of the ACK/NACK/DTX detection.

PTL 3 merely discloses a technical idea of judging that the device is in a DTX state when the device does not receive delivery acknowledgement information with respect to each packet within a predetermined period of time.

PTL 4 merely discloses a technical idea of performing a process of receiving delivery acknowledgement information or a CQI mapped in a physical uplink control channel (PUCCH) located on both sides of a system band, when delivery acknowledgement information or a CQI relating to a mobile station which does not receive user data in an uplink is received in a subframe.

PTL 5 merely discloses a base station including a PUCCH extraction unit which extracts, from a PUCCH signal included in a receiving signal, a signal in a PUCCH region associated with a bundled ACK/NACK resource notified to a terminal in advance.

In view of the above, an object of the present invention is to provide a technique that enables to avoid a "DTX-ACK" error or a "DTX-NACK" error in a wireless communication system, in which packet re-transmission control by an HARQ and judgment on reception confirmation at a terminal are performed, even when the terminal fails to receive uplink control information.

Solution to Problem

One aspect of the present invention is a base station in which a wireless communication system for performing packet re-transmission control by an HARQ (Hybrid Automatic Repeat reQuest), the base station comprises:

PUSCH receiving processing means which receives HARQ information from a PUSCH (Physical Uplink Shared CHannel), and performs CRC (cyclic redundancy check) check determination with respect to packet data included in the PUSCH, when transmission timings between the HARQ information received from a terminal and the PUSCH transmitted from the terminal coincide with each other; and HARQ information determination means which performs reception confirmation based on the HARQ at the terminal by receiving the HARQ information and the CRC check result determined by the PUSCH receiving processing means.

Advantageous Effects of Invention

According to the present invention, it is possible to avoid a "DTX-ACK" error or a "DTX-NACK" error even when a terminal fails to receive uplink control information.

DESCRIPTION OF EMBODIMENTS

Related Art

First of all, a related art is described to facilitate understanding of the present invention.

Figure 1:
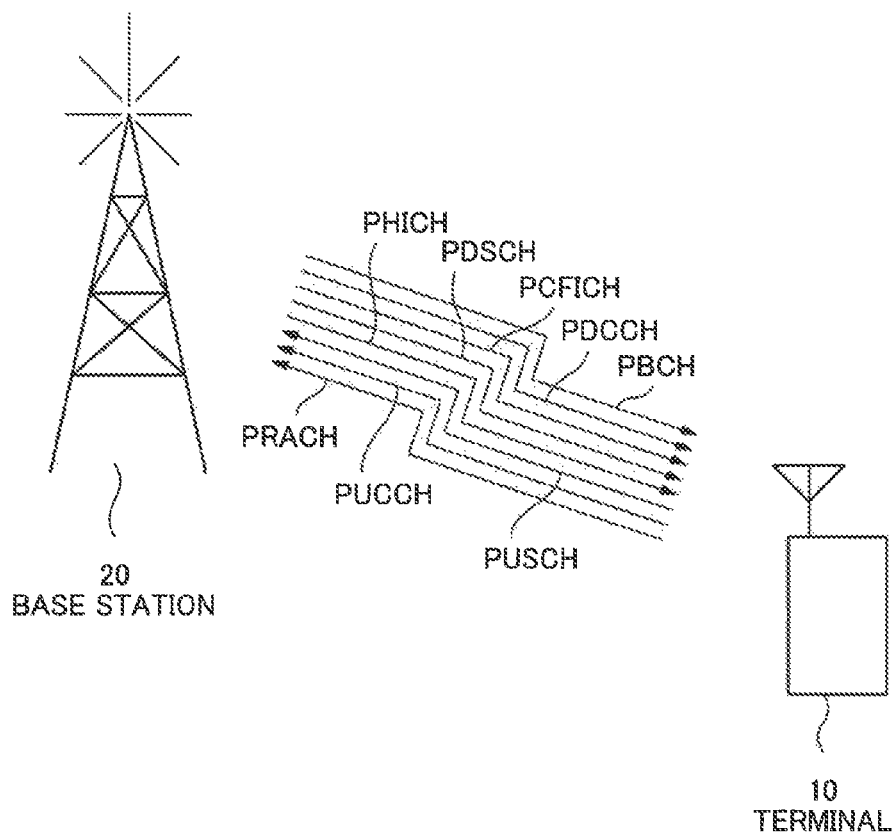
FIG. 1 is a block diagram illustrating a configuration of an LTE (Long Term Evolution) method of a related art, which is one of the methods for a mobile communication system to which the present invention is applied.

FIG. 1 is a block diagram illustrating a configuration of an LTE (Long Term Evolution) method of a related art, which is one of the methods for a mobile communication system to which the present invention is applied.

As illustrated in FIG. 1, the LTE method includes a terminal 10 as a mobile station, and a base station 20. Note that FIG. 1 illustrates only one terminal 10 and only one base station 20 for convenience of explanation. Actually, however, there are provided a plurality of terminals 10 and a plurality of base stations 20.

Radio links (physical channels) are set between the terminal 10 and the base station 20. Regarding the radio links (physical channels), a link from the terminal 10 to the base station 20 is referred to as an uplink, and a link from the base station 20 to the terminal 10 is referred to as a downlink.

Regarding physical channels for use in the LTE method, the following five physical channels are defined as physical downlink channels through which data is transmitted from the base station 20 to the terminal 10.

Specifically, the five physical downlink channels are constituted by a PBCH (Physical Broadcast CHannel), a PDCCH (Physical Downlink Control CHannel), a PCFICH (Physical Control Format Indicator CHannel), a PDSCH (Physical Downlink Shared CHannel), and a PHICH (Physical Hybrid-arq Indicator CHannel).

A PBCH is a channel for transmitting broadcast information. A PDCCH is a channel for transmitting information for decoding downlink packet data. A PCFICH is a channel for transmitting information for decoding a PDCCH. A PDSCH is a channel for transmitting downlink packet data. A PHICH is a channel for transmitting a CRC check result with respect to a PUSCH (Physical Uplink Shared CHannel) to be described later.

Further, in the LTE method, the following three physical channels are defined as physical uplink channels through which data is transmitted from the terminal 10 to the base station 20.

Specifically, the three physical uplink channels are constituted by a PRACH (Physical Random Access CHannel), a PUCCH (Physical Uplink Control CHannel), and a PUSCH.

A PRACH is a channel for transmission in order to perform electric power control while synchronizing with an uplink. A PUCCH is a channel for transmitting HARQ information to be described later, or a CQI (Channel Quality Indicator), a PMI (Precoding Matrix Indicator), or an RI (Rank Indicator) indicating a receiving quality. HARQ information is information for notifying a decoding status of a PDSCH as ACK (ACKnowledgment)/NACK (Negative ACKnowledgment)/DTX (Discontinuous Transmission). A PUSCH is a channel for transmitting uplink packet data, in addition to information included in a PUCCH. Note that one of a PUCCH and a PUSCH is transmitted according to the presence or absence of uplink packet data.

Figure 2:
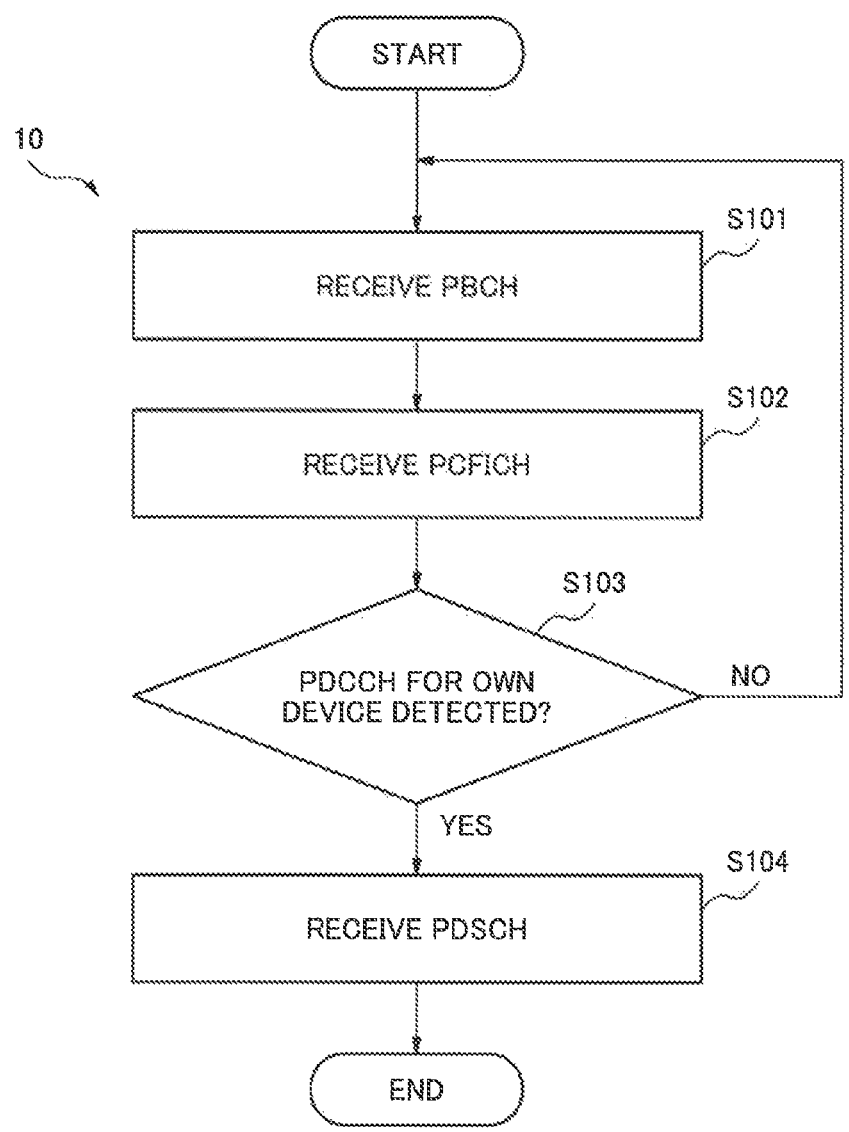
FIG. 2 is a flowchart for describing an operation of a terminal when the terminal receives a signal from a base station in the LTE method of the related art.
Figure 3:
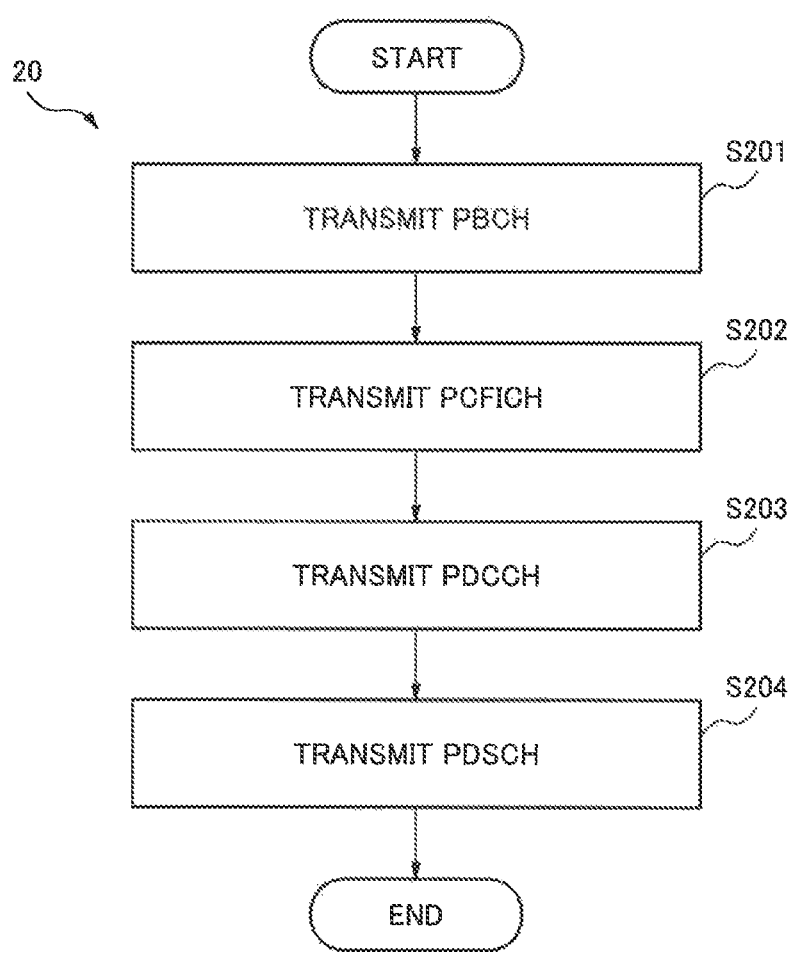
FIG. 3 is a flowchart for describing an operation of the base station when the terminal receives a signal from the base station in the LTE method of the related art.

Next, an operation to be performed when the terminal 10 receives a signal from the base station 20 in the LTE method of the related art is described referring to FIG. 2 and FIG. 3.

As illustrated in FIG. 3, the base station 20 transmits a PBCH (Step S201), and then transmits a PCFICH (Step S202).

On the other hand, as illustrated in FIG. 2, first of all, the terminal 10 receives a PBCH transmitted from the base station 20 (Step S101), and then receives a PCFICH (Step S102).

As illustrated in FIG. 3, the base station 20 transmits a PDCCH (Step S203), and then transmits a PDSCH (Step S204).

As illustrated in FIG. 2, subsequently, the terminal 10 detects whether or not a PDCCH for the own device is present by confirming the number of OFDM (Orthogonal Frequency Division Multiplex) symbols in which a PDCCH is mapped on the basis of a CFI (Control Format Indicator) value detected from a PCFICH (Step S103). Then, when a PDCCH for the own device is detected (YES in Step S103), the terminal 10 starts receiving a PDSCH by detected downlink control information (Step S104).

Figure 4:
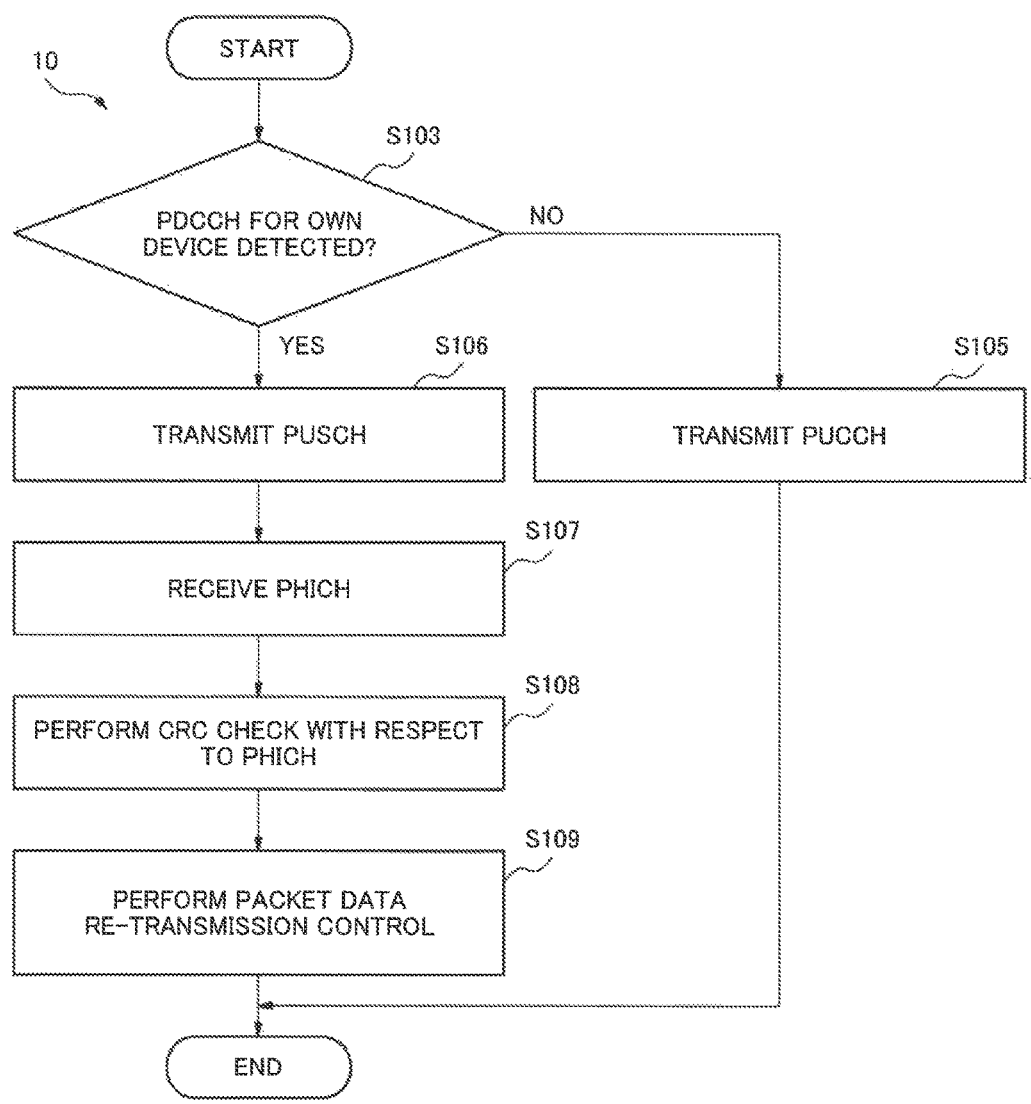
FIG. 4 is a flowchart for describing an operation of the terminal when the terminal transmits a signal to the base station in the LTE method of the related art.
Figure 5:
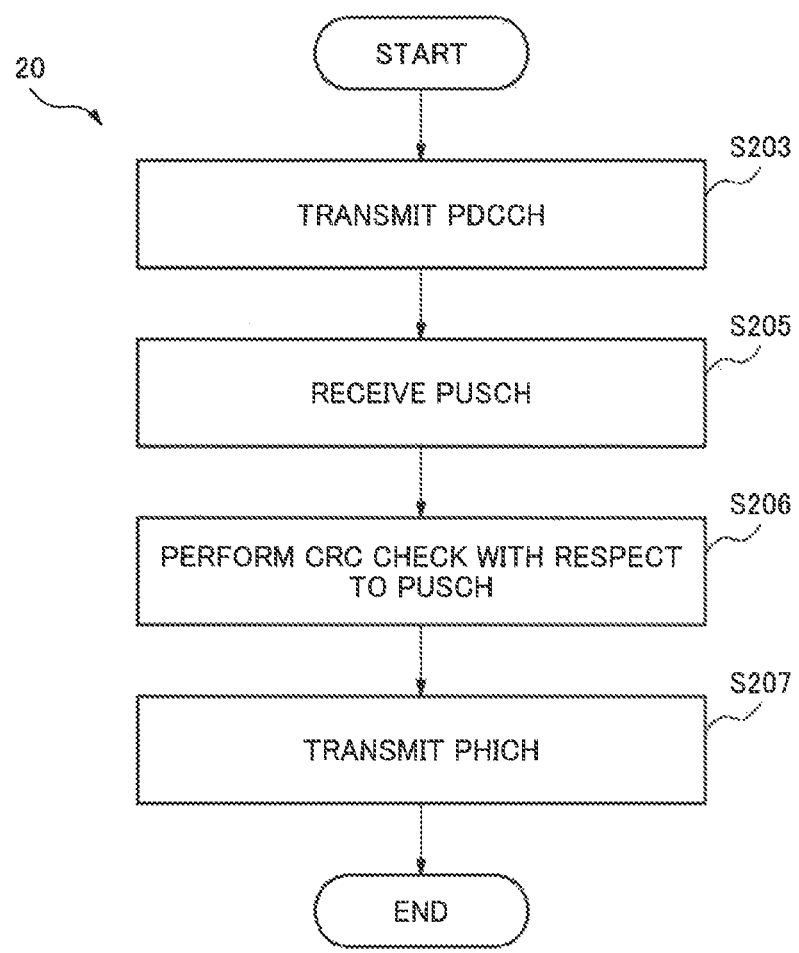
FIG. 5 is a flowchart for describing an operation of the base station when the terminal transmits a signal to the base station in the LTE method of the related art.

Next, an operation to be performed when the terminal 10 transmits a signal to the base station 20 in the LTE method of the related art is described referring to FIG. 4 and FIG. 5.

As illustrated in FIG. 5, the base station 20 transmits a PDCCH (Step S203).

Referring to FIG. 4, when a PDCCH for the own device to be transmitted from the base station 20 is not detected (NO in Step S103), the terminal 10 transmits a PUCCH (Step S105).

On the other hand, when a PDCCH for the own device is detected (YES in Step S103), the terminal 10 starts transmitting a PUSCH by detected uplink control information (Step S106).

Further, in this case, as illustrated in FIG. 5, the base station 20 receives a PUSCH (Step S205), performs a CRC (cyclic redundancy check) check with respect to the received PUSCH (Step S206), and transmits the check result to the terminal 10 by a PHICH (Step S207).

Referring back to FIG. 4, the terminal 10 receives a PHICH from the base station (Step S107), performs a CRC check with respect to the PHICH (Step S108), and performs re-transmission control of uplink packet data on the basis of the CRC result (Step S109).

In the LTE method, a DRX function is employed for the purpose of electric power saving of the terminal 10. The DRX function is a function of causing the terminal 10 to sleep in a specific state, and to stop monitoring a PDCCH for reducing electric power consumption of the terminal 10.

Specifically, it is assumed that the terminal 10 does not receive a PDCCH in an OnDuration section when the terminal 10 is Active, because there is no data to be transmitted or received. In this case, the terminal 10 having a DRX function decodes a PDCCH to be transmitted from the base station 20 for scheduling only in a next OnDuration section. A section when the terminal 10 does not decode a PDCCH is referred to as a "DRX section".

On the other hand, when the terminal 10 receives a PDCCH in an OnDuration section when the terminal 10 is Active, the terminal 10 is allowed to activate a DRX Inactivity Timer of the terminal 10 (extend an OnDuration section when the terminal 10 is Active), and to continue data communication. Note that in this case, the base station 20 activates a DRX Inactivity Timer of the base station 20 (extends an OnDuration section when the base station 20 is Active) as well.

It is assumed that the terminal 10 fails to receive a PDCCH (NO in Step S103 in FIG. 4) due to a wireless error or the like, regardless that the base station 20 has transmitted the PDCCH to the terminal 10 (see Step S203 in FIG. 5). In this case, when the OnDuration section of the base station 20 during which only the base station 20 is Active is extended, wireless resources may be useless even when the base station 20 continues scheduling and transmits a PDCCH, because the terminal 10 is in a DRX section.

In view of the above, Japanese Patent Application No. 2013-055039 describes a method for avoiding a "DTX-ACK" error and a "DTX-NACK" error when the base station 20 transmits a PDSCH, and a PDCCH for uplink control information (Uplink Grant) to the terminal 10.

In this example, a "DTX-ACK" error and a "DTX-NACK" error mean that the base station 20 erroneously detects an ACK or a NACK, regardless that the terminal 10 judges a decoding status of a PDSCH as a DTX. Specifically, it is assumed that the terminal 10 judges a decoding status of a PDSCH as a DTX in a downlink, regardless that the baste station 20 has transmitted the PDSCH. In this case, the base station 20 decodes HARQ information with respect to a PUSCH, in place of a PUCCH. Therefore, when a decoding status of a PDSCH is a DTX, the base station 20 may decode packet data with respect to a PUSCH as HARQ information, and may erroneously detect a decoding status of a PDSCH as an ACK or a NACK.

Further, generally, in an HARQ re-transmission control in an uplink, when the base station 20 determines a CRC check result with respect to a PUSCH (see Step S206 in FIG. 5) as a NACK, the base station 20 judges that "the terminal 10 receives a PDCCH" (see YES in Step S103 in FIG. 4). This allows for the base station 20 to transmit only HARQ information to the terminal 10 by a PHICH (see Step S207 in FIG. 5) without transmitting a PDCCH, which is referred to as Non-adaptive re-transmission, and to schedule re-transmission. However, even when the aforementioned control is performed, a "DTX-ACK" error and a "DTX-NACK" error may occur.

Although the method described in Japanese Patent Application No. 2013-055039 may provide a solving means when the terminal 10 successfully receives uplink control information (YES in Step S103 in FIG. 4), the method does not provide a solving means when the terminal 10 fails to receive uplink control information (NO in Step S103 in FIG. 4).

For instance, it is assumed that the terminal 10 judges a PDSCH as an ACK, but fails to receive uplink control information (see NO in Step S103 in FIG. 4) when the base station 20 transmits a PDSCH, and a PDCCH for uplink control information to the terminal 10 (see Step S203 and Step S204 in FIG. 3). In this case, the terminal 10 transmits HARQ information by a PUCCH in place of a PUSCH (see Step S105 in FIG. 4). However, the base station 20 tries to judge HARQ information by decoding a PUSCH (see Step S205 and Step S206 in FIG. 5). As a result, a "DTX-ACK" error or a "DTX-NACK" error may occur.

In view of the above, taking into consideration the aforementioned drawback, an object of the present invention is to provide a technique that enables to avoid a "DTX-ACK" error or a "DTX-NACK" error in a wireless communication system in which packet re-transmission control by an HARQ and judgment on reception confirmation at a terminal are performed, even when the terminal fails to receive uplink control information.

Exemplary Embodiment

An exemplary embodiment of the present invention is directed to a base station including a PUSCH receiving processing unit, a PUCCH receiving processing unit, and an HARQ information determination unit in a wireless communication system for performing packet re-transmission control by an HARQ.

The PUSCH receiving processing unit performs CRC check determination of packet data included in a PUSCH. When transmission timings between HARQ information and a PUSCH coincide with each other, the PUSCH receiving processing unit receives HARQ information from the PUSCH.

The PUCCH receiving processing unit receives HARQ information from a PUCCH when transmission timings between HARQ information and a PUSCH do not coincide with each other.

The HARQ information determination unit performs HARQ-based reception confirmation at a terminal by receiving HARQ information and a CRC check result determined by the PUSCH receiving processing unit and the PUCCH receiving processing unit.

It is assumed that a base station has transmitted a PDCCH only for uplink control information to a terminal. In this case, the PUSCH receiving processing unit performs CRC check determination. The HARQ information determination unit judges that the terminal has transmitted a PUSCH only when a CRC check result is OK, and activates a DRX Inactivity Timer. This is for the purpose of avoiding a "DTX-ACK" error or a "DTX-NACK" error at the time of determining whether or not a PUSCH is received when the terminal fails to receive a PDCCH.

It is assumed that the base station has transmitted a PDSCH, and a PDCCH for uplink control information to the terminal. In this case, regarding an uplink, the PUSCH receiving processing unit performs CRC check determination. The HARQ information determination unit judges that the terminal has transmitted a PUSCH only when a CRC check result is OK, and activates a DRX Inactivity Timer. Regarding a downlink, the PUSCH receiving processing unit performs CRC check determination. The HARQ information determination unit activates a DRX Inactivity Timer only when a CRC check result is OK, and when HARQ information received from the terminal is judged to be an ACK or a NACK.

Further, even when CRC check determination with respect to a PUSCH is NG, the terminal may receive a PDCCH, and may activate a DRX Inactivity Timer of the terminal. Therefore, prohibiting the base station from activating a DRX Inactivity Timer of the base station at the time of re-transmission makes it possible to avoid allocating useless resources to the terminal by mismatching of a DRX state.

According to the exemplary embodiment of the present invention, it is possible to avoid a "DTX-ACK" error and a "DTX-NACK" error relating to a PUSCH and a PDSCH.

Note that a configuration in which the above exemplary embodiment is expressed by replacing the base station with a method; a terminal associated with the base station and a method to be executed by the terminal; a wireless communication system including the base station and a terminal; programs which cause a computer to execute these methods; a recording medium recording these programs; and the like are advantageously included as the exemplary embodiment of the present invention.

In the following, specific examples of the present invention are described. The present invention, however, may be implemented in a form other than the specific examples, and is not limited to the specific examples.

First Specific Example

Figure 6:
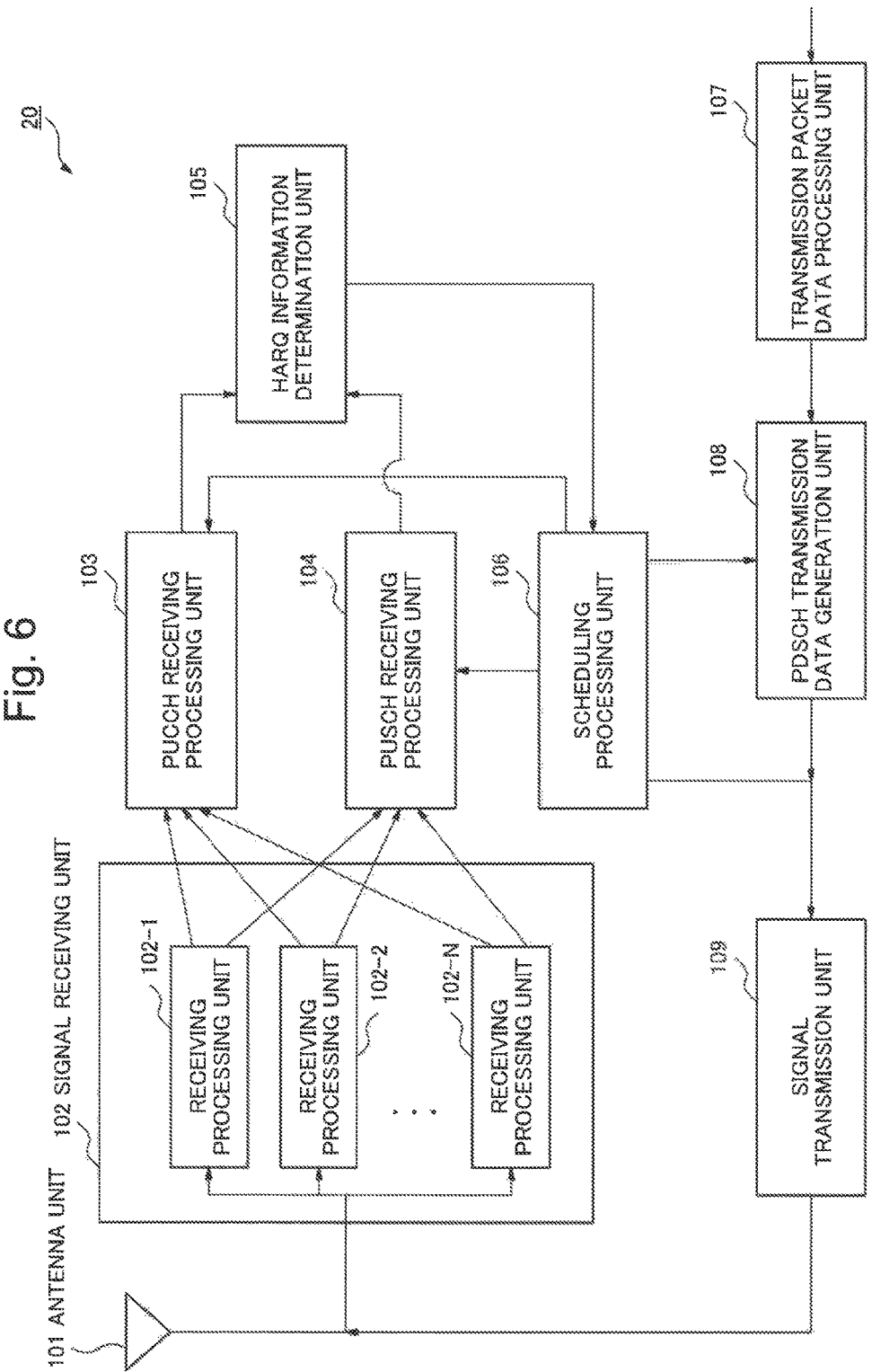
FIG. 6 is a block diagram illustrating a configuration of a base station in a wireless communication system according to a first specific example of the present invention.

FIG. 6 is a block diagram illustrating a configuration of a base station 20 in a wireless communication system according to a first specific example of the present invention.

Referring to FIG. 6, the base station 20 includes an antenna unit 101, a signal receiving unit 102, a PUCCH receiving processing unit 103, a PUSCH receiving processing unit 104, a scheduling processing unit 106, an HARQ information determination unit 105, a transmission packet data processing unit 107, a PDSCH transmission data generation unit 108, and a signal transmission unit 109.

The signal receiving unit 102 includes first to N-th receiving processing units 102-1 to 102-N (where N is a positive integer), which are associated with respective mobile stations (terminals) 10. The first to N-th receiving processing units 102-1 to 102-N separate uplink signals from the mobile stations 10 received by the antenna unit 101 into receiving signals for each mobile station 10, and convert the receiving signals into baseband signals. Then, the first to N-th receiving processing units 102-1 to 102-N transmit the converted baseband signals to the PUCCH receiving processing unit 103 and the PUSCH receiving processing unit 104.

The PUCCH receiving processing unit 103 extracts a downlink receiving signal quality (CQI), HARQ receiving information, and an uplink data transmission request from an input baseband signal. Then, the PUCCH receiving processing unit 103 transmits HARQ receiving information to the HARQ information determination unit 105.

The PUCCH receiving processing unit 103 receives HARQ information from a PUCCH, which is transmitted from the terminal 10, when transmission timings between HARQ information received from the terminal 10, and a PUSCH transmitted from the terminal 10 do not coincide with each other.

The PUSCH receiving processing unit 104 extracts uplink data packets from the mobile station 10, a downlink receiving signal quality (CQI), and HARQ receiving information. Then, the PUSCH receiving unit 104 transmits HARQ receiving information to the HARQ information determination unit 105. Further, the PUSCH receiving processing unit 104 performs CRC check with respect to uplink data packets received from the mobile station 10, and transmits the CRC check result to the HARQ information determination unit 105.

The PUSCH receiving processing unit 104 receives HARQ information from a PUSCH, and performs CRC check determination with respect to packet data included in the PUSCH when transmission timings between HARQ information received from the terminal 10 and PUSCH transmitted from the terminal 10 coincide with each other.

The HARQ information determination unit 105 holds HARQ receiving information with respect to a PDSCH, which is received from the PUCCH receiving processing unit 103 and the PUSCH receiving processing unit 104. Further, the HARQ information determination unit 105 holds a CRC check result with respect to a PUSCH, which is received from the PUSCH receiving processing unit 104. Specifically, the HARQ information determination unit 105 is operated as a holding means which holds HARQ receiving information and a CRC check result. Further, the HARQ information determination unit 105 judges an HARQ receiving result in a downlink and an HARQ receiving result in an uplink between the base station 20 and the mobile stations 10 to be administered from received (held) information. Further, the HARQ information determination unit 105 transmits HARQ receiving results to the scheduling processing unit 106.

The scheduling processing unit 106 judges packet data re-transmission control, and a DRX state on the basis of HARQ receiving results input from the HARQ information determination unit 105. In particular, the scheduling processing unit 106 executes scheduling in an OnDuration section or when an Inactivity Timer is activated both in a downlink and in an uplink on the basis of a judged DRX state, and allocates wireless resources.

The scheduling processing unit 106 transmits the above-described result of resource allocation to the PUCCH receiving processing unit 103, the PUSCH receiving processing unit 104, the PDSCH transmission data generation unit 108, and the signal transmission unit 109.

The PUCCH receiving processing unit 103 and the PUSCH receiving processing unit 104 execute a data receiving process on the basis of the input resource allocation result. The PDSCH transmission data generation unit 108 executes a data transmission process on the basis of the input resource allocation result.

The transmission packet data processing unit 107 transmits transmission data (downlink data) for each mobile station 10 to the PDSCH transmission data generation unit 108.

The PDSCH transmission data generation unit 108 transmits packet data generated in the transmission packet data processing unit 107 to a selected mobile station 10.

The signal transmission unit 109 generates and transmits a PDCCH to a selected mobile station 10 on the basis of information input from the scheduling processing unit 106 and the PDSCH transmission data generation unit 108. Further, the signal transmission unit 109 transmits packet data generated in the transmission packet data processing unit 108 as a PDSCH.

Next, an operation of the base station 20 in the first specific example is described in detail referring to the drawings.

Figure 7:
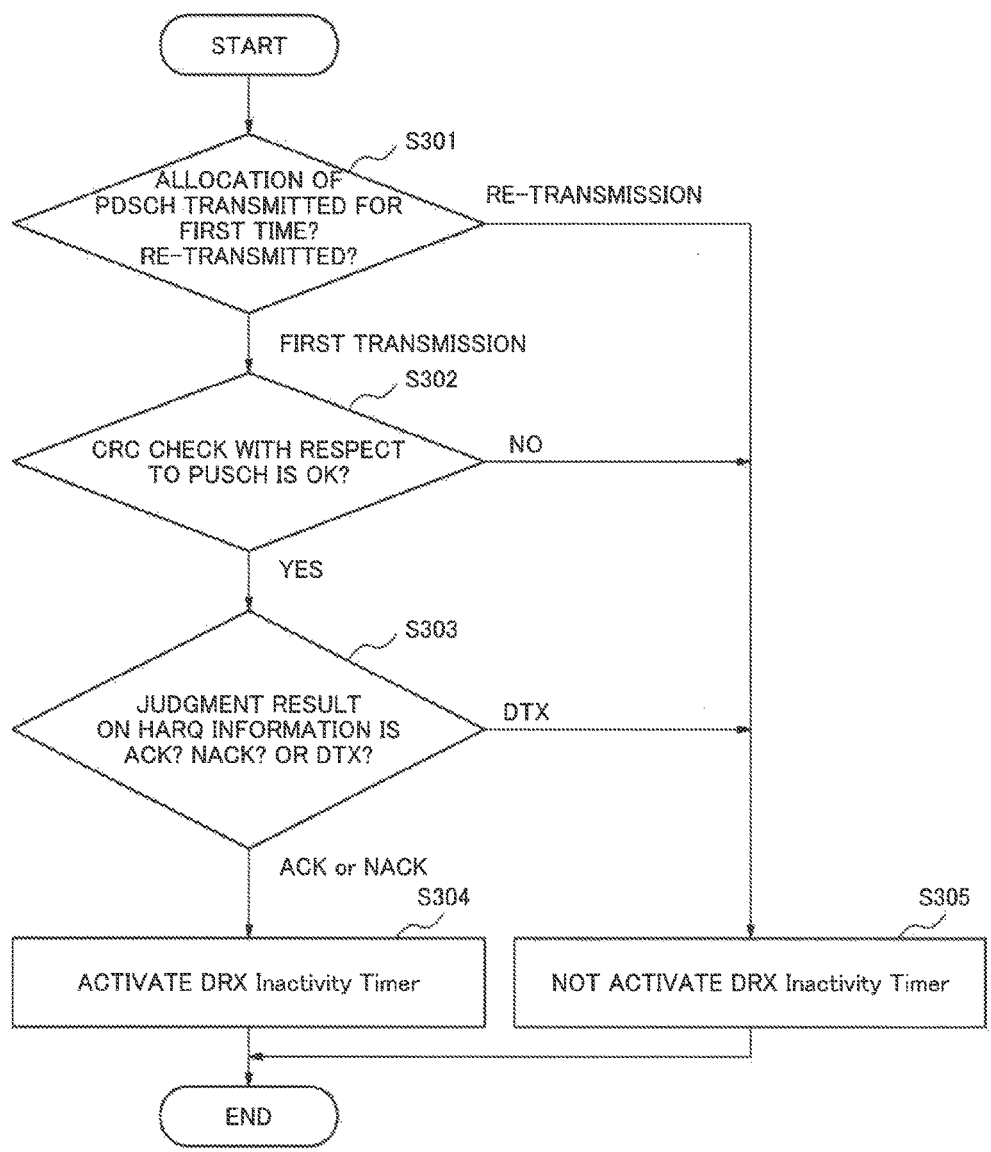
FIG. 7 is a flowchart illustrating an HARQ determination operation and a DRX Inactivity Timer activation determination operation relating to a downlink in the base station in the wireless communication system according to the first specific example of the present invention.

FIG. 7 is a flowchart illustrating an HARQ determination operation and a DRX Inactivity Timer activation determination operation relating to a downlink by the HARQ information determination unit 105 and the scheduling processing unit 106.

FIG. 7 illustrates a DRX Inactivity Timer activation determination procedure in the first exemplary embodiment when the base station 20 performs scheduling with respect to a PDSCH and a PUSCH simultaneously, and the base station 20 receives HARQ information with respect to the PDSCH from the PUSCH, because transmission timings between HARQ information and the PUSCH coincide with each other.

Referring to FIG. 7, first of all, the scheduling processing unit 106 judges whether or not a scheduled PDSCH is transmitted for the first time or is re-transmitted in the HARQ process (Step S301).

Next, when it is judged that a PDSCH is transmitted for the first time in Step S301, the HARQ information determination unit 105 judges whether or not a CRC is OK from a CRC check result with respect to a PUSCH, which is input from the PUSCH receiving processing unit 104 (Step S302).

Next, when a CRC check result in Step S302 is OK (YES), the HARQ information determination unit 105 determines HARQ information with respect to a PDSCH, which is scheduled simultaneously with a PUSCH input from the PUSCH receiving processing unit 104 (Step S303).

Next, when HARQ information is judged to be an ACK or a NACK in Step S303, the HARQ information determination unit 105 judges that the terminal 10 successfully receives a PDCCH for allocating PDSCH resources, and activates the DRX Inactivity Timer (Step S304).

On the other hand, when it is judged that a PDSCH is re-transmitted in Step S301, the HARQ information determination unit 105 does not activate the DRX Inactivity Timer (Step S305). The reason for this is to avoid that only the base station 20 activates the DRX Inactivity Timer because the terminal 10 may receive a PDCCH for allocating PDSCH resources at the first transmission.

Further, when a CRC check result is NG (NO) in Step S302, the HARQ information determination unit 105 does not activate the DRX Inactivity Timer (Step S305). The reason for this is to avoid that only the base station 20 activates the DRX Inactivity Timer because it is not possible to accurately judge whether or not the terminal 10 successfully receives a PDCCH for allocating PDSCH resources.

Further, when HARD information is judged to be a DTX in Step S303, the HARQ information determination unit 105 judges that the terminal 10 fails to receive a PDCCH for allocating PDSCH resources, and does not activate the DRX Inactivity Timer (Step S305).

Figure 8:
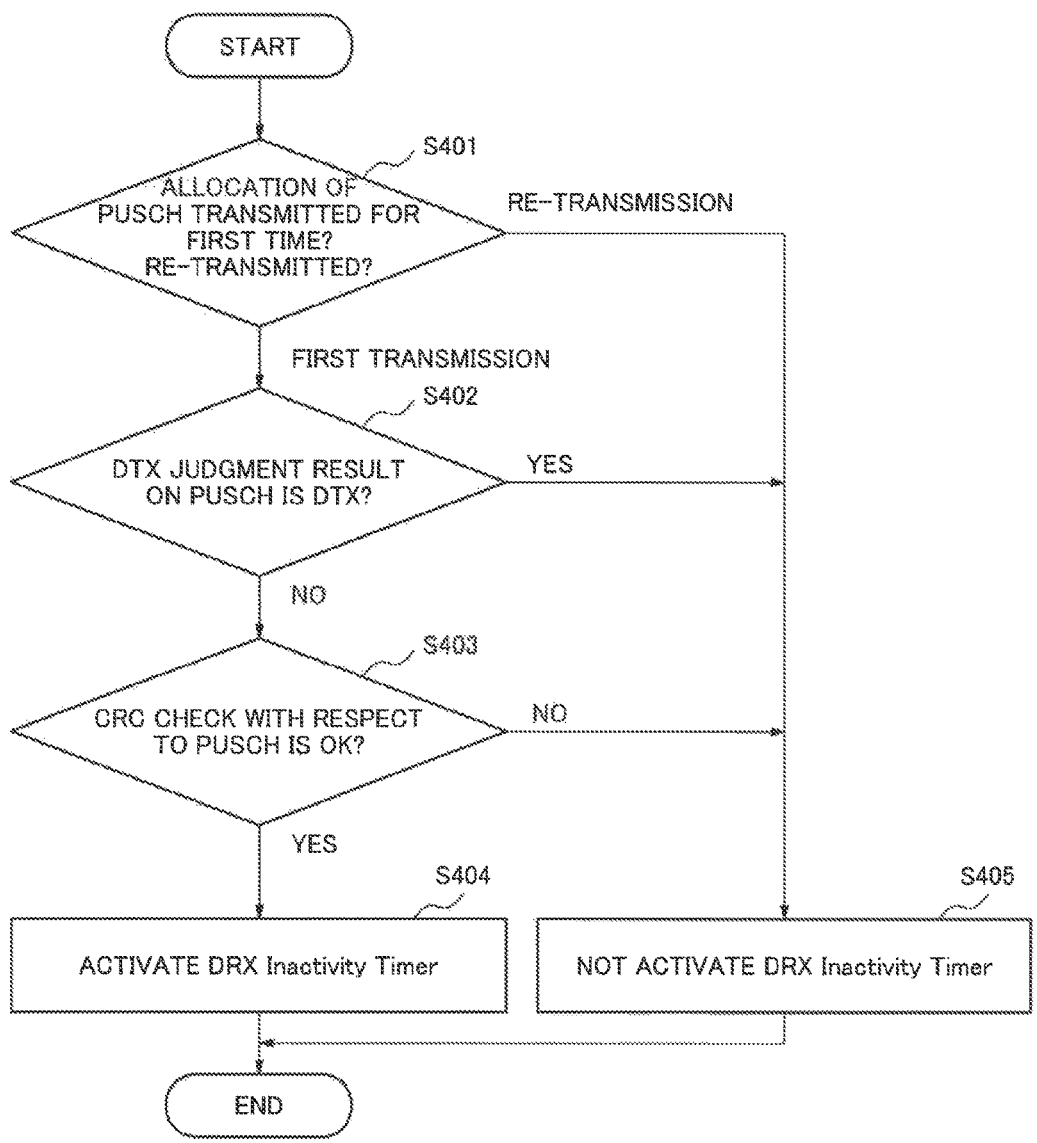
FIG. 8 is a flowchart illustrating an HARQ determination operation and a DRX Inactivity Timer activation determination operation relating to an uplink in the base station in the wireless communication system according to the first specific example of the present invention.

FIG. 8 is a flowchart illustrating an HARQ determination operation and a DRX Inactivity Timer activation determination operation relating to an uplink by the HARQ information determination unit 105 and the scheduling processing unit 106.

FIG. 8 illustrates a DRX Inactivity Timer activation determination procedure in the first exemplary embodiment when the base station 20 performs scheduling with respect to a PUSCH, and the base station 20 receives the PUSCH.

Referring to FIG. 8, first of all, the scheduling processing unit 106 judges whether a scheduled PUSCH is transmitted for the first time or is re-transmitted in the HARQ process (Step S401).

Next, when it is judged that a PUSCH is transmitted for the first time in Step S401, the HARQ information determination unit 105 judges a DTX determination result with respect to a PUSCH, which is input from the PUSCH receiving processing unit 104 (Step S402).

Next, when it is judged that a DTX determination result indicates the absence of a DTX in Step S402, the HARQ information determination unit 105 judges whether or not a CRC is OK from a CRC check result with respect to a PUSCH, which is input from the PUSCH receiving processing unit 104 (Step S403).

Next, when a CRC check result is judged to be OK in Step S403, the HARQ information determination unit 105 judges that the terminal 10 successfully receives a PDCCH for allocating PUSCH resources, and activates the DRX Inactivity Timer (Step S404).

On the other hand, when it is judged that a PUSCH is re-transmitted in Step S401, the HARQ information determination unit 105 does not activate the DRX Inactivity Timer (Step S405). The reason for this is to avoid that only the base station 20 activates the DRX Inactivity Timer because the terminal 10 may receive a PDCCH for allocating PUSCH resources at the first transmission.

Further, when a DTX determination result is judged to be a DTX in Step S402, the HARQ information determination unit 105 does not activate the DRX Inactivity Timer (Step S405). The reason for this is to avoid that only the base station 20 activates the DRX Inactivity Timer because it is judged that the terminal 10 fails to receive a PDCCH for allocating PUSCH resources.

Further, when a CRC check result is NG (NO) in Step S403, the HARQ information determination unit 105 does not activate the DRX Inactivity Timer (Step S405). The reason for this is to avoid that only the base station 20 activates the DRX Inactivity Timer because it is not possible to accurately judge that the terminal 10 successfully receives a PDCCH for allocating PUSCH resources.

Next, advantageous effects of the first specific example are described.

The first advantageous effect is that it is possible to suppress a possibility of scheduling of useless resources. The reason for this is as follows. The base station 20 may erroneously judge that the terminal 10 successfully receives a PDCCH, which is transmitted for scheduling in the terminal 10 due to a "DTX-ACK" error and a "DTX-NACK" error between the base station 20 and the terminal 10. This may cause the base station 20 to activate the DRX Inactivity Timer, and accordingly, may perform scheduling of useless resources. In order to suppress the aforementioned possibility, in a downlink, it is possible to suppress erroneous judgment by determining activation of a DRX Inactivity Timer on the basis of a CRC check result with respect to a PUSCH, which is scheduled simultaneously with scheduling of a PDSCH, and on the basis of HARQ information transmitted by the terminal 10.

The second advantageous effect is that it is possible to suppress erroneous judgement on a "DTX-NACK" error. The reason for this is that in an uplink, activation of a DRX Inactivity Timer is determined on the basis of a CRC check result with respect to a PUSCH as well as the aforementioned reason. The probability that a CRC is accidentally determined to be OK is significantly low. Therefore, the need of taking into consideration occurrence of a "DTX-ACK" error is low.

The third advantageous effect is that it is possible to suppress allocation of useless resources. The reason for this is that prohibiting activation of a DRX Inactivity Timer without depending on HARQ determination or a CRC check result with respect to a PUSCH makes it possible to suppress deviation of activation timings between the terminal 10 and the DRX Inactivity Timer.

Second Specific Example

The second specific example of the present invention is described in detail referring to the drawing. The basic configuration of the second specific example of the present invention is the same as the first specific example of the present invention. Therefore, in the following, an operation method, which is different from the first specific example, is described.

Figure 9:
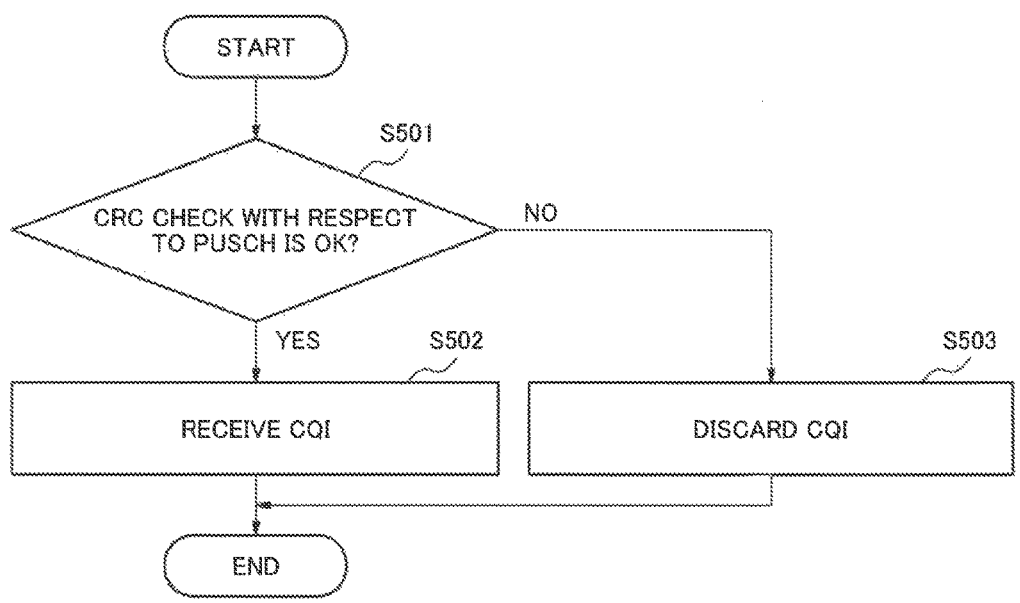
FIG. 9 is a flowchart illustrating an HARQ determination operation and a CQI receiving determination operation relating to an uplink in a base station in a wireless communication system of a second specific example of the present invention.

FIG. 9 is a flowchart illustrating an HARQ determination operation and a CQI receiving determination operation relating to an uplink in a base station 20 in a wireless communication system of the second specific example of the present invention.

FIG. 9 is a flowchart illustrating a receiving determination operation of CQI information relating to an uplink in an HARQ information determination unit 105 and a scheduling processing unit 106.

FIG. 9 illustrates a CQI receiving determination procedure when the base station 20 performs scheduling of a PUSCH, whose transmission timing coincides with a transmission timing of a periodic CQI, and the base station 20 receives CQI information by a PUSCH.

Referring to FIG. 9, first of all, the HARQ information determination unit 105 judges whether or not a CRC is OK from a CRC check result with respect to a PUSCH, which is input from the PUSCH receiving processing unit 104.

Next, when the CRC check result is judged to be OK in Step S501, the HARQ information determination unit 105 judges that the terminal 10 successfully receives a PDCCH for allocating PUSCH resources, and receives CQI information included in a PUSCH (Step S502).

On the other hand, when the CRC check result is NG (NO) in Step S501, the HARQ information determination unit 105 does not receive CQI information (Step S503). The reason for this is to avoid erroneous detection of a CQI, because it is not possible to accurately judge that the terminal 10 successfully receives a PDCCH for allocating PUSCH resources.

An advantageous effect of the second specific example of the present invention is that it is possible to suppress erroneous detection of CQI information. The reason for this is as follows. In a wireless communication system by an LTE method, a Single Carrier Frequency Division Multiple Access (SC-FDMA) is used in an uplink. Therefore, when PUSCH resources are allocated at a same timing in a periodic CQI to be normally transmitted by a PUCCH, the periodic CQI is transmitted by a PUSCH, in place of a PUCCH. As a result, the base station 20 may erroneously detect CQI information when the terminal 10 fails to receive a PDCCH for scheduling of a PUSCH.

In the foregoing, some specific examples of the present invention are described. The present invention, however, is not limited to the aforementioned specific examples. Further modifications, replacements, and adjustments may be added, as far as the modifications, the replacements, and the adjustments do not deviate from the basic technical idea of the present invention. For instance, in the aforementioned specific examples, a configuration in which mismatching of a DRX state is avoided, and a configuration in which erroneous detection of CQI information is avoided are exemplarily described. The present invention is also applicable to a configuration, in which mismatching of another state between a base station and a terminal in a wireless communication system is avoided.

The whole or part of the exemplary embodiments disclosed above can be described as, but not limited to, the following supplementary notes.

(Supplementary Note 1)

A base station in a wireless communication system for performing packet re-transmission control by an HARQ (Hybrid Automatic Repeat reQuest), the base station comprising:

a PUSCH receiving processing unit which receives HARQ information from a PUSCH (Physical Uplink Shared CHannel), and performs CRC (cyclic redundancy check) check determination with respect to packet data included in the PUSCH, when transmission timings between the HARQ information received from a terminal and the PUSCH transmitted from the terminal coincide with each other; and a HARQ information determination unit which performs reception confirmation based on the HARQ at the terminal by receiving the HARQ information and the CRC check result determined by the PUSCH receiving processing unit.

(Supplementary Note 2)

The base station according to Supplementary note 1, wherein, when the base station transmits a PDCCH (Physical Downlink Control CHannel) only for uplink control information to the terminal, the HARQ information determination unit judges that the terminal transmits the PUSCH and activates a DRX Inactivity Timer, only when the CRC check result is OK.

(Supplementary Note 3)

The base station according to Supplementary note 1, wherein, when the base station transmits, to the terminal, a PDSCH (Physical Downlink Shared CHannel), and a PDCCH (Physical Downlink Control CHannel) for uplink control information, the HARQ information determination unit judges that the terminal transmits the PUSCH and activates a DRX Inactivity Timer, only when the CRC check result is OK regarding an uplink.

(Supplementary Note 4)

The base station according to Supplementary note 1, wherein, when the base station transmits, to the terminal, a PDSCH (Physical Downlink Shared CHannel), and a PDCCH (Physical Downlink Control CHannel) for uplink control information, the HARQ information determination unit activates a DRX Inactivity Timer, only when the CRC check result is OK, and only when the HARQ information received from the terminal is judged to be an ACK or a NACK, regarding a downlink.

(Supplementary Note 5)

The base station according to Supplementary note 3 or 4, wherein when the PDSCH is re-transmitted, the HARQ information determination unit does not activate the DRX Inactivity Timer.

(Supplementary Note 6)

The base station according to any one of Supplementary notes 2 to 4, wherein when CRC check determination with respect to the PUSCH is NG, the HARQ information determination unit does not activate the DRX Inactivity Timer.

(Supplementary Note 7)

The base station according to any one of Supplementary notes 1 to 6, further comprising:

PUCCH receiving processing unit which receives the HARQ information from a PUCCH (Physical Uplink Control CHannel) transmitted from the terminal, when transmission timings between the HARQ information and the PUSCH do not coincide with each other, wherein the HARQ information determination unit performs reception confirmation based on the HARQ at the terminal by receiving the HARQ information and the CRC check result determined by the PUSCH receiving processing unit and the PUCCH receiving processing unit.

(Supplementary Note 8)

The base station according to Supplementary note 1, wherein, when the base station performs scheduling of the PUSCH, whose transmission timing coincides with a transmission timing of a periodic CQI (Channel Quality Indicator), the HARQ information determination unit receives CQI information included in the PUSCH only when the CRC check result is judged to be OK.

(Supplementary Note 9)

A mobile communication system comprising:

the base station according to any one of Supplementary notes 1 to 8; and a terminal which communicates with the base station.

(Supplementary Note 10)

A reception confirmation method at a terminal by a base station in a wireless communication system for performing packet re-transmission control by an HARQ (Hybrid Automatic Repeat reQuest), the reception confirmation method comprising:

a PUSCH (Physical Uplink Shared CHannel) receiving process for receiving HARQ information from a PUSCH (Physical Uplink Shared CHannel), and performing CRC (cyclic redundancy check) check determination with respect to packet data included in the PUSCH, when transmission timings between the HARQ information received from the terminal, and the PUSCH transmitted from the terminal coincide with each other; and a HARQ information determination process for performing reception confirmation based on the HARQ at the terminal by receiving the HARQ information and the CRC check result determined in the CRC check determination.

(Supplementary Note 11)

The reception confirmation method according to Supplementary note 10, wherein, when the base station transmits a PDCCH (Physical Downlink Control CHannel) only for uplink control information to the terminal, the HARQ information determination process includes judging that the terminal transmits the PUSCH and activating a DRX Inactivity Timer, only when the CRC check result is OK.

(Supplementary Note 12)

The reception confirmation method according to Supplementary note 10, wherein, when the base station transmits, to the terminal, a PDSCH (Physical Downlink Shared CHannel), and a PDCCH (Physical Downlink Control CHannel) for uplink control information, the HARQ information determination process includes judging that the terminal transmits the PUSCH and activating a DRX Inactivity Timer, only when the CRC check result is OK regarding an uplink.

(Supplementary Note 13)

The reception confirmation method according to Supplementary note 10, wherein, when the base station transmits, to the terminal, a PDSCH (Physical Downlink Shared CHannel), and a PDCCH (Physical Downlink Control CHannel) for uplink control information, the HARQ information determination process includes activating a DRX Inactivity Timer, only when the CRC check result is OK, and only when the HARQ information received from the terminal is judged to be an ACK or a NACK, regarding a downlink.

(Supplementary Note 14)

The reception confirmation method according to Supplementary note 12 or 13, wherein when the PDSCH is re-transmitted, the DRX Inactivity Timer is not activated, at the HARQ information determination process.

(Supplementary Note 15)

The reception confirmation method according to any one of Supplementary notes 11 to 14, wherein when CRC check determination with respect to the PUSCH is NG, the DRX Inactivity Timer is not activated, at the HARQ information determination process.

(Supplementary Note 16)

The reception confirmation method according to any one of Supplementary notes 10 to 15, further comprising:

a PUCCH receiving process for receiving the HARQ information from a PUCCH (Physical Uplink Control CHannel) transmitted from the terminal, when transmission timings between the HARQ information and the PUSCH do not coincide with each other, wherein the HARQ information determination process includes performing reception confirmation based on the HARQ at the terminal by receiving the HARQ information and the CRC check result determined at the PUSCH receiving process and the PUCCH receiving process.

(Supplementary Note 17)

The reception confirmation method according to Supplementary note 10, wherein, when the base station performs scheduling of the PUSCH, whose transmission timing coincides with a transmission timing of a periodic CQI (Channel Quality Indicator), the HARQ information determination process includes receiving CQI information included in the PUSCH only when the CRC check result is judged to be OK.

(Supplementary Note 18)

A reception confirmation program which causes a computer as a base station in a wireless communication system for performing packet re-transmission control by an HARQ (Hybrid Automatic Repeat reQuest) to perform reception confirmation at a terminal, the program causing the computer to execute:

a PUSCH receiving processing step of receiving HARQ information from a PUSCH (Physical Uplink Shared CHannel), and performing CRC (cyclic redundancy check) check determination with respect to packet data included in the PUSCH, when transmission timings between the HARQ information received from the terminal, and the PUSCH transmitted from the terminal coincide with each other; and an HARQ information determination step of performing reception confirmation based on the HARQ at the terminal by receiving the HARQ information and the CRC check result determined in the PUSCH receiving processing step.

(Supplementary Note 19)

A recording medium recording the reception confirmation program according to Supplementary note 18.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-115581, filed on Jun. 4, 2014, the disclosure of which is incorporated herein in its entirety by reference.

REFERENCE SIGNS LIST

10 Terminal (Mobile station)
20 Base station
101 Antenna unit
102 Signal receiving unit
102-1 to 102-N Receiving processing unit
103 PUCCH receiving processing unit
104 PUSCH receiving processing unit
105 HARQ information determination unit
106 Scheduling processing unit
107 Transmission packet data processing unit
108 PDSCH transmission data generation unit
109 Signal transmission unit

The invention claimed is:

1. A base station in a wireless communication system for performing packet re-transmission control by an HARQ (Hybrid Automatic Repeat reQuest), the base station comprising:

a PUSCH receiving processing circuit which receives HARQ information from a PUSCH (Physical Uplink Shared CHannel), and performs CRC (cyclic redundancy check) check determination with respect to packet data included in the PUSCH; and a HARQ information determination circuit which, in response to transmission timing of HARQ information received from a terminal coinciding with timing of the packet data included in the PUSCH transmitted from the terminal, performs reception confirmation based on a) the HARQ information received from the PUSCH and b) the CRC check result determined by the PUSCH receiving processing circuit.

2. The base station according to claim 1, wherein, the base station transmits uplink control information to the terminal via a PDCCH (Physical Downlink Control CHannel), the HARQ information determination circuit judges the terminal which transmits the HARQ information via the PUSCH and activates a DRX Inactivity Timer in response to the CRC check result being OK.

3. The base station according to claim 1, wherein, the base station transmits, to the terminal, via a PDSCH (Physical Downlink Shared CHannel) for data, and a PDCCH (Physical Downlink Control CHannel) for uplink control information, the HARQ information determination circuit judges the terminal which transmits the packet data via the PUSCH and activates a DRX Inactivity Timer in response to the CRC check result being OK regarding an uplink.

4. The base station according to claim 1, wherein, the base station transmits, to the terminal, via a PDSCH (Physical Downlink Shared CHannel) for data, and a PDCCH (Physical Downlink Control CHannel) for uplink control information, the HARQ information determination circuit activates a DRX Inactivity Timer in response to a) the CRC check result being OK, and b) the HARQ information received from the terminal is judged to be an ACK or a NACK regarding a downlink.

5. The base station according to claim 1, further comprising:
a PUCCH receiving processing circuit receives the HARQ information from a PUCCH (Physical Uplink Control CHannel) transmitted from the terminal in response to transmission timing of the HARQ information not coinciding with timing of packet data included in the PUSCH, wherein
the HARQ information determination circuit performs reception confirmation based on a) the HARQ information received from the PUCCH and b) the CRC check result determined by the PUSCH receiving processing circuit and the PUCCH receiving processing circuit.

6. The base station according to claim 1, wherein, the base station performs data transmission scheduling of the PUSCH, whose transmission timing coincides with a transmission timing of a periodic CQI (Channel Quality Indicator), the HARQ information determination circuit receives CQI information included in the PUSCH only in response to the CRC check result being judged to be OK.

7. A mobile communication system comprising:
a base station; and
a terminal which communicates with the base station, wherein the base station is configured for performing packet re-transmission control by an HARQ (Hybrid Automatic Repeat reQuest), the base station comprising:

a PUSCH receiving processing circuit which receives HARQ information from a PUSCH (Physical Uplink Shared CHannel), and performs CRC (cyclic redundancy check) check determination with respect to packet data included in the PUSCH; and
a HARQ information determination circuit which, in response to transmission timing of HARQ information received from a terminal coinciding with timing of the packet data included in the PUSCH transmitted from the terminal, performs reception confirmation based on a) the HARQ information received from the PUSCH and b) the CRC check result determined by the PUSCH receiving processing circuit.

8. A reception confirmation method by a base station in a wireless communication system for performing packet re-transmission control by an HARQ (Hybrid Automatic Repeat reQuest), the reception confirmation method comprising:
receiving HARQ information from a PUSCH (Physical Uplink Shared CHannel), and performing CRC (cyclic redundancy check) check determination with respect to packet data included in the PUSCH; and
in response to transmission timing of HARQ information received from a terminal coinciding with timing of the packet data included in the PUSCH, performing reception confirmation based on a) the HARQ information received from the PUSCH and b) the CRC check result determined in the CRC check determination.

9. The reception confirmation method according to claim 8, wherein
the HARQ information is received from a PUCCH (Physical Uplink Control CHannel) transmitted from the terminal in response to transmission timing of the HARQ information not coinciding with timing of packet data included in the PUSCH, and
the reception confirmation is based on a) the HARQ information received from the PUCCH and b) the CRC check result obtained by the CRC check determination when reception confirmation based on the HARQ at the terminal is performed.

10. A non-transitory storage medium storing a reception confirmation program which causes a computer as a base station in a wireless communication system for performing packet re-transmission control by an HARQ (Hybrid Automatic Repeat reQuest) to perform reception confirmation at a terminal, the program causing the computer to execute:
a PUSCH receiving processing step of receiving HARQ information from a PUSCH (Physical Uplink Shared CHannel), and performing CRC (cyclic redundancy check) check determination with respect to packet data included in the PUSCH, when transmission timings between the HARQ information received from the terminal, and the PUSCH transmitted from the terminal coincide with each other; and
an HARQ information determination step of performing reception confirmation based on the HARQ at the terminal by receiving the HARQ information and the CRC check result determined in the PUSCH receiving processing step.

* * * * *